Patented Oct. 21, 1947

2,429,565

UNITED STATES PATENT OFFICE 2,429,565

REACTION PRODUCTS OF HEXAMETHYL-ENETETRAMINE AND PETROLEUM WAX SUBSTITUTED OXYAROMATIC COMPOUNDS HAVING RUBBERLIKE PROPERTIES AND METHOD OF PREPARING SAME

Orland M. Reiff, Woodbury, N. J., assignor to Socony-Vacuum Oil Company, Incorporated, a corporation of New York No Drawing. Application December 2, 1943, Serial No. 512,603

4 Claims. (Cl. 260—51)

This invention relates to synthetic compositions of matter having rubber-like properties and is specifically concerned with hardening of certain alkylated aromatic bodies to form such synthetic compositions.

The alkylated aromatic material to be treated is composed of aromatic nuclei which are predominantly at least di-substituted by predominantly straight-chain alkyl groups, such as are obtained from petroleum wax. These basic substances may be advantageously prepared by a Friedel-Crafts reaction between aromatic material and a chlorinated petroleum wax of at least 25 per cent chlorine content in a ratio of at least two mols of combined chlorine per mol of aromatic material, preferably at least 3 to 1. These materials are themselves of a rubber-like nature, as described in copending application Serial No. 427,588, filed January 21, 1942, by Orland M. Reiff and John J. Giammaria. Before hardening, the basic materials of that application will soften and become tacky when heated. In this state, they will flow under light pressure. In these respects the materials of the said application are similar to unvulcanized rubber. I have now found that the said basic materials may be hardened by processes known for the treatment of natural rubber; whereby the above disadvantages are overcome and the tensile strength, resistance to solvents, and other properties are greatly improved.

As formed in a Friedel-Crafts synthesis, the alkyl side chains of the basic material may include some double bonds. Preferably, the basic material is further treated to increase the number of double bonds, as by the process of copending application Serial No. 432,278, filed February 25, 1942, in which I am a co-inventor. This is accomplished by dehalogenation of a wax aromatic compound having halogen substituents on the side chains.

Although products of this type generally contain some chlorine because of incomplete reaction, the amount of chlorine remaining will usually not exceed about two per cent by weight. In order to form a wax aromatic compound, particularly of the wax phenol type, completely free of chlorine, it is necessary to run a prolonged reaction which results in some cracking of the substituted wax groups and the formation of a product of lower viscosity and of less desirable characteristics.

To prepare the intermediate of the present invention, a higher amount of halogen is intentionally allowed to remain in the Friedel-Crafts reaction product or introduced thereafter by halogenating the wax aromatic compound, followed by dehalogenating the product, after decomposition or removal of the AlCl₃ catalyst, or other metal halide catalyst, by heating in the presence or absence of dehalogenating agents. By this dehalogenating procedure, an improved composition for the present purpose is obtained. The product has itself higher tensile strength as a rubber-like composition and greater toughness and durability as a hard plastic material, and is more valuable for the preparation of hardened products.

PREPARATION OF PLASTIC AND RUBBER-LIKE COMPOSITIONS

In the following examples, procedures will be given for the formation of the halogen-containing wax aromatic compounds as division (a); and the dehalogenation step will be outlined as part (b).

(a) *Halogen-containing wax aromatic compounds*

A rubber-like composition comprising a chlorine-containing wax phenol, prepared as outlined below, by tri-substitution of phenol with wax of 27% chlorine content, will have a phenol content of about 25%, a chlorine content of about 5%, the remainder of the molecule consisting of combined wax. The compositions may be represented by the following general formula which is not an attempt to give, however, an exact representation of the molecule. For simplicity, the different aromatic nuclei are represented by the phenyl radical.

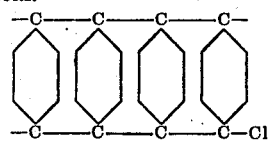

The compositions are represented in the foregoing formula with a single attachment of the aromatic group to each wax group, but in the reaction of chlorwax of high chlorine content with aromatic compounds as carried out in the preparation of plastic and rubber-like intermediates, apparently the aromatic group will be attached in some cases to more than one carbon of the same wax group, particularly in reactions with aromatic compounds of the condensed nuclei and polycyclic type.

Some chain formation would be expected to occur in the reaction of aromatic compounds with chlorinated waxes, in which case the following representation would be applicable,→representing a continuation of the chain

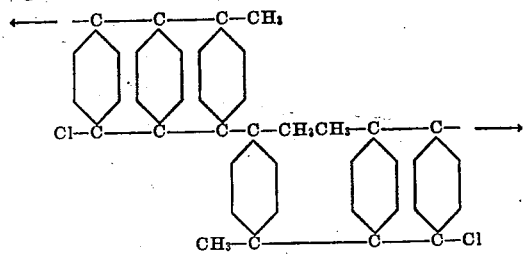

The halogen is represented in the foregoing formulae as an end carbon substituent, but the position of the halogen group is undeterminable, except that it is substituted in the aliphatic group. The compositions are represented as di-alkyl-substituted aromatic compounds, but an amount of chlorwax can be reacted which is sufficient to substitute all the replaceable hydrogen of the aromatic nuclei. Generally, an amount of chlorwax sufficient to at least tri-substitute the aromatic compound is favored. Chlorinated wax of 50% chlorine content can be prepared conveniently. This degree of chlorination of the wax can be used in formation of the plastic and rubber-like compositions, but will require the use of a powerful mixer because of the high viscosity of the mixture obtained. A tough, rubber-like product results during the formation of the wax phenol described below, containing 5% chlorine, which can be carried out in ordinary laboratory reactors of glass.

PREPARATION OF WAX PHENOLS CONTAINING CHLORINE

*Reaction mixture*

| | Grams |
|---|---|
| Phenol | 48 |
| Chlorinated wax of 27% chlorine content | 200 |
| AlCl$_3$ (anhy.) | 3 |

Paraffin wax of A. S. T. M. melting point of about 126° F. and of average molecular weight of about 350 is melted and a current of chlorine is introduced at a temperature of about 250° F. until 27% by weight of chlorine is absorbed. The phenol is then added, followed by addition of the anhydrous AlCl$_3$ at a temperature of about 190° F. with rapid stirring. The temperature of the mixture is gradually raised to about 350° F. during a one-hour period with efficient stirring to reduce foaming caused by evolution of HCl. The reaction mixture is then held at this temperature about one hour to bring about sufficient reaction.

It has been discovered that the reaction product, upon becoming highly viscous and difficult to stir, will break up into fine particles if allowed to stand with the temperature maintained at the point of high viscosity development. Hence, it is desirable to discontinue stirring at the point of high viscosity, followed by renewed stirring at the point where break up of the material occurs. High viscosity development in the formation of the present wax phenol occurs at about 325° F.

The reaction mixture is then cooled and contacted with water to decompose the aluminum chloride reaction product, whereby the aluminum chloride can be removed from the mixture. To ensure complete removal of any corrosive halogen, the product is digested with dilute (1%) caustic soda by refluxing the mixture several hours, followed by removing the alkaline solution and water-washing or neutralizing with dilute hydrochloric or acetic acid. Aqueous ammonia can also be used in the removal of corrosive halogen, which is advantageous because of the readiness with which the ammonia can be removed after the digesting operation. In this state, the product can be formed into a sheet by running through squeeze rolls and further washing with water in this rolling operation. The rubber-like composition can be readily dried on a heated mill roll or can be cut into sheets and laid aside to dry.

In the foregoing procedure, the chlorine content of the finished product is controlled by the amount of AlCl$_3$ used as catalyst in the Friedel-Crafts reaction. As an alternative procedure, the chlorwax and phenol can be reacted in the presence of sufficient AlCl$_3$ to substantially eliminate the chlorine as HCl, followed by cooling the mixture, diluting with ethylene dichloride and introducing chlorine until the desired amount of halogen is absorbed. The reaction product is then purified as outlined above. This procedure is only applicable where the wax phenol is soluble in organic solvents, as, for example, a diwax phenol prepared from wax of 27% chlorine content.

(b) *Dehalogenation of halogen-containing wax aromatic compounds*

Chlorine-containing wax phenol, prepared as outlined in the foregoing, can be dehalogenated thermally or by heating in the presence of agents such as aqueous or alcoholic solutions of caustic soda; ammonia or amines, alkali cyanides, cyanates or thio-cyanates. Contact clays and silica gel are excellent dehalogenating agents, but their removal from the plastic and rubber-like compositions is difficult. When the dehalogenation is carried out in the presence of caustic soda, some hydroxylation takes place; in the presence of ammonia or amines, amino groups are introduced; in the presence of alkali cyanides, cyanates, or thio-cyanates, cyano, cyanate and thio-cyanate groups, respectively, are introduced. Any method of dehalogenation, however, results in the formation of unsaturated products. Dehalogenation in the presence of dilute caustic soda for the purpose of neutralizing HCl is the preferred procedure.

DEHALOGENATION OF WAX PHENOL CONTAINING 4% CHLORINE

*Reaction mixture*

| | | |
|---|---|---|
| Wax phenol (prepared as in (a) above) | grams | 260 |
| 3% aqueous caustic soda solution | cc | 700 |

PROCEDURE

The chlorine-containing wax phenol from the Friedel-Crafts reactor is agitated with the dilute caustic soda solution at a temperature of about 500° F. for a period of about 2 to 4 hours. In the dehalogenation, the product is broken up into small particles which can be readily purified by water-washing. The general procedure consists in removing the caustic solution by water-washing alone or by neutralizing with dilute hydrochloric or acetic acid. When hydrochloric acid is used as the neutralizing agent, it is customary to make the mixture slightly alkaline with ammonia to ensure complete neutralization of any corrosive HCl. The product is then further washed with water and milled into sheets by the procedure outlined above in the purification of the chlorine-containing wax aromatic compounds.

A rubber-like composition derived from the foregoing chlorine-containing wax phenol of Example I by dehalogenating, will have a combined phenol content of about 25% and approximately 75% of combined wax. A small amount of halogen will remain because of incomplete dehalogenation. A minor amount of hydroxylation will be obtained since caustic soda is used as the dehalogenating agent.

The above-described aromatics, substituted by side chains of enhanced unsaturation are the preferred intermediates utilized in practicing the present invention. Regardless of whether this additional unsaturation of the side chains is accomplished, the intermediate is subjected to a condensation reaction which is parallel to the well known phenol formaldehyde reaction in its chemical aspects. The condensing agent used is a compound having a reactive methylene group capable of undergoing a condensation reaction with phenols. For simplicity, the substituted aromatics will be numerically designated by numerals in parenthesis following the name of the aromatic, the first number indicating degree of substitution and the second the percentage chlorine content of the chlorwax used in a Friedel-Crafts reaction to cause alkylation. Thus, "wax phenol (3–27)" is phenol which has been reacted with 27% chlorwax in proportion to tri-alkylate the phenol, i. e., one mol of phenol to three mols of combined chlorine.

Improved products are formed by the reaction stated generally above. The products obtained have higher tensile strength as soft rubber-like compositions and when the reaction is carried out with a substituted phenol made from a wax having a high chlorine content, there is obtained a material resembling hard rubber which has high shock resistance at normal temperatures. Since any reactive chlorine remaining in the product of the Friedel-Crafts reaction is preferably removed to a substantially complete extent, the products are rendered non-corrosive and have improved electric properties.

The action of aldehydes in both acid and alkaline media is contemplated. As an acid medium, hydrochloric acid is preferred as the catalytic agent and is effective in a concentration of 1%. Caustic soda in a concentration of 1% is an active agent in condensing aldehydes and the like with the wax-substituted hydroxy-aromatic compounds, but aldehyde condensation products with ammonia or amines are especially preferred, as the aldehyde agent can, in this form, be compounded with the media on a rubber mill after the purification has been completed and then heated in a mold to give the desired product.

In general, formaldehyde is preferred as the condensing agent and this agent is particularly effective in forming molded compositions of high fusion point when used in the form of hexamethylenetetramine.

EXAMPLE I

A sample of wax phenol (3–27), containing about 5% by weight of chlorine, was dehalogenated by reaction with dilute aqueous caustic soda by the above procedure.

This product was then compounded with 2% by weight of hexamethylenetetramine on a rubber mill and then heated in a mold at about 150° C. for one hour. During this heat treatment the product conformed to the shape of the mold and was converted to a flexible product of high fusion point.

EXAMPLE II

The experiment of Example I was repeated but with the additional incorporation of 40% of carbon black. This product, when heated in the mold, was converted to a product of higher tensile strength and greater tear resistance than the product of Example I.

EXAMPLE III

A sample of wax phenol (3–27) containing about 5% chlorine was dehalogenated by passing superheated steam into the finished Friedel-Crafts reaction. The steaming was continued about 5 hours at a temperature of about 500° F. A current of $CO_2$ was then introduced while cooling the mixture to sweep out the steam vapor, thereby giving an anhydrous mixture.

A sample of this product was compounded with 2% of hexamethylenetetramine and molded one hour at 150° C. The molded product was similar to that of Example I.

EXAMPLE IV

A sample of wax phenol (3–30) which was treated by thermal dehalogenation as described in Example III was compounded with 2% by weight of hexamethylenetetramine and molded at 150° C. The molded product was harder and had high shock resistance at normal temperatures.

EXAMPLE V

A sample of wax phenol (3–27) containing about 5% chlorine was dehalogenated by reaction with an aqueous solution of sodium monosulfide in an amount equivalent to the chlorine content of the wax phenol by the above procedure.

This product was then compounded with 2% by weight of hexamethylenetetramine and heated in a mold at 180° C. for one hour. The molded product had high flexibility.

EXAMPLE VI

A sample of wax phenol (3–27), containing about 5% chlorine, was dehalogenated by reaction with an aqueous solution of sodium cyanide.

This product, when compounded with 2% by weight of haxamethylenetetramine and heated in a mold one hour at about 150° C., gave a product of high flexibility which resembled the material of Example V.

EXAMPLE VII

A sample of wax phenol (3–27) containing about 5% chlorine was dehalogenated by reaction with dilute caustic soda to form a wax phenol of about 25% combined phenol content. This product was then further reacted with a one-fourth molar quantity of aqueous solution of formaldehyde on the basis of the phenol content of the wax phenol in the presence of a 1% caustic soda solution. The condensation reaction was carried out during a 5-hour period at a temperature of 350° F. The product was then washed free of caustic soda on a rubber mill and dried by heating during the milling operation. The reaction with formaldehyde was found to form a tougher product of higher fusion point, but was still a soft rubber-like composition suitable for compounding with fillers or aldehyde ammonia curing agents.

EXAMPLE VIII

A sample of wax phenol (3-27) which was dehalogenated by reaction with caustic soda, was reacted with a one-fourth molar quantity of formaldehyde in the presence of a 1% aqueous solution of hydrogen chloride at reflux temperature during a 3-hour period. The reaction product was then washed free of hydrochloric acid and dried. The reaction with formaldehyde was found to result in formation of a product of higher fusion point and of improved tensile strength. The product was a soft, rubber-like composition which resembled the material of Example VII.

EXAMPLE IX

A sample of wax phenol (3-28) containing about 5% chlorine was dehalogenated by reaction with aqueous caustic soda.

This product was then compounded with 3% by weight of hexamethylenetetramine and 20% by weight of zinc oxide on a rubber mill and then molded at about 150° C. for one hour. The product had a tensile strength of 1000 lbs. per square inch and an elongation of 100% at 80° F. The incorporation of zinc oxide gave a product of greater softness and flexibility. The resistance to tear was appreciably increased.

I claim:

1. A process that comprises reacting 2% of hexamethylenetetramine with a composition formed by chlorinating petroleum wax to the extent of 27% by weight, reacting the chlorinated petroleum wax by a Friedel-Crafts reaction with an oxyaromatic compound of the group consisting of phenols, naphthols and diphenyl ether in the ratio of 3 mols of chlorinated wax to 1 mol of oxyaromatic compound and removing the residual chlorine from the composition before reacting it with the hexamethylenetetramine by treating the composition with dilute caustic soda at 500° F. for 2 to 4 hours.

2. A composition of matter that results from reacting 2% of hexamethylenetetramine with a composition formed by chlorinating petroleum wax to the extent of 27% by weight, reacting the chlorinated petroleum wax by a Friedel-Crafts reaction with an oxyaromatic compound of the group consisting of phenols, naphthols and diphenyl ether in the ratio of 3 mols of chlorinated wax to 1 mol of oxyaromatic compound and removing the residual chlorine from the composition before reacting it with the hexamethylenetetramine by treating the composition with dilute caustic soda at 500° F. for 2 to 4 hours.

3. A process that comprises reacting 2% of hexamethylenetetramine with a composition formed by chlorinating petroleum wax to the extent of 27% by weight, reacting the chlorinated petroleum wax by a Friedel-Crafts reaction with phenol in the ratio of 3 mols of chlorinated wax to 1 mol of phenol and removing the residual chlorine from the composition before reacting it with the hexamethylenetetramine by treating the composition with dilute caustic soda at 500° F. for 2 to 4 hours.

4. A composition of matter that results from reacting 2% of hexamethylenetetramine with a composition formed by chlorinating petroleum wax to the extent of 27% by weight, reacting the chlorinated petroleum wax by a Friedel-Crafts reaction with phenol in the ratio of 3 mols of chlorinated wax to 1 mol of phenol and removing the residual chlorine from the composition before reacting it with the hexamethylenetetramine by treating the composition with dilute caustic soda at 500° F. for 2 to 4 hours.

ORLAND M. REIFF.

REFERENCES CITED

The following references are of record in the file of this patent:

UNITED STATES PATENTS

| Number | Name | Date |
|---|---|---|
| 2,178,571 | Flett | Nov. 9, 1939 |
| 2,162,172 | Honel | June 13, 1939 |
| 2,062,676 | Reiff | Dec. 1, 1936 |